3,037,958
COATING COMPOSITION COMPRISING AN EPOXIDIZED CRESOL-FORMALDEHYDE RESIN AND A COPOLYMER OF STYRENE, PROCESS FOR PREPARING SAME, AND PROCESS FOR COATING ARTICLES THEREWITH

Alvin R. Ingram, Beaver, and Leonard F. Guziak, Pittsburgh, Pa., assignors to Koppers Company, Inc., a corporation of Delaware
No Drawing. Filed Dec. 22, 1959, Ser. No. 861,189
4 Claims. (Cl. 260—43)

This invention relates generally to coating compositions and more particularly to baked coating compositions that are based on thermoset, infusible, insoluble polymers formed of a mixture of a multipolymer of high styrene content and an epoxide.

Decorative and protective coatings are applied to metal appliances, automobiles, tank cars, tin cans, collapsible tubes, and electric wires by applying the coating to the article and then heating or baking the coating on the article.

It has now been discovered that a strong corrosion-resistant flexible and durable coating can be prepared from an admixture of an epoxidized cresol-formaldehyde novolak resin and a multipolymer of styrene, 2-ethyl hexyl acrylate, methacrylic acid and 4-vinyl pyridine.

The epoxidized cresol-formaldehyde novolak resin for use with this invention is a resin represented at least in part by the formula

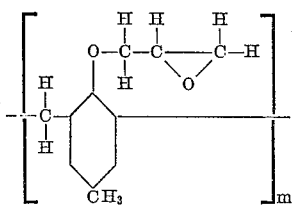

where $m$ is between 3 and 8. A procedure for forming such resin is described in U.S. Patent No. 2,653,885.

The multipolymer which constitutes the other component of the novel composition is formed by polymerizing styrene, 2-ethyl hexyl acrylate, glacial methacrylic acid, and 4-vinyl pyridine in the presence of an initiator such as benzoyl peroxide in an inert organic solvent.

A particularly excellent coating can be made when the terpolymer is produced from ingredients in the following ratio: styrene 70.0 parts, 2-ethyl hexyl acrylate 19.0 parts, methacrylic acid 11.0 parts, and 4-vinyl pyridine 0.4 part. There should, however, be at least 50 parts of styrene, 15 parts of 2-ethyl hexyl acrylate, 5 parts of methacrylic acid, and 0.1 part of 4-vinyl pyridine used in the formation of the multipolymer.

It has been found advantageous to carry out the polymerization of the monomers of the multipolymer in a polar solvent such as methyl ethyl ketone or a polar solvent in a non-polar solvent. Thus, a mixture of xylene, and isopropyl alcohol may be used. The conversion rate with a diluted polar solvent is somewhat slower than with a polar solvent. It is believed that the co-polymerized methacrylic acid, is in a non-polar solution, dimerized by hydrogen bonding across the polymer chain to form a three dimension cross-linked structure and yield a gel.

The conversion rate of the monomers to the polymers, however, varies with temperatures. At a reaction temperature of 80° C. a high conversion rate was obtained, conversion being completed within 20 hours. At lower temperatures, such as 70° C., the time for conversion may require 30 hours, or more. The solution in which the multipolymer polymerization is carried out later serves as a solvent for the composition of the invention.

Advantageously, the two components are prepared separately, maintained separate, and mixed prior to the application of the mixture to an article as a coating. In contrast, however, to the normal two component, the admixture of the two components of this invention has a pot life of at least a month. Thus, the coating composition can be prepared as a single composition, if the composition is to be used within a month.

The invention will be illustrated further by the following examples wherein parts are parts by weight.

Example I

An epoxidized cresol novolak of the general formula

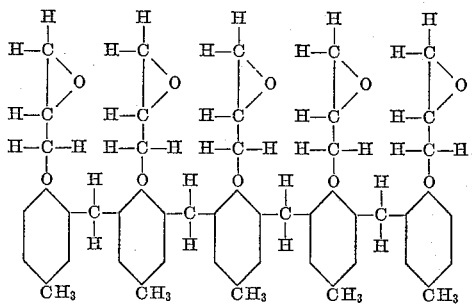

was prepared in accordance with the procedure described in U.S. Patent No. 2,653,885.

A multipolymer was prepared by adding to a reactor equipped with an agitator, 27.3 parts of xylene, 27.3 parts of anhydrous isopropyl alcohol, 70 parts by weight of styrene, 19 parts of 2-ethyl hexyl acrylate and 11 parts by weight of glacial methacrylic acid. Agitation was started and 3 parts of benzoyl peroxide were added. The reaction was then heated to 80° C. within thirty minutes and held at 80° C. for 14 hours thereafter. The reaction mixture was then cooled to 60° C. and an additional 27.3 parts of xylene were added. The multipolymer thus prepared had a ratio of 55 parts of multipolymer to 45 parts of solvents.

To 88 parts of multipolymer in solvent was added 12 parts of the epoxidized cresol-formaldehyde. This provided a composition that was suitable for application to the surface to be decorated or protected.

Example II

A clear coating was prepared by mixing 55.2 parts of the epoxidized cresol-formaldehyde novolak of Example I, 400 parts of the multipolymer of Example I, 2.3 parts of Cellosolve acetate, and 2.3 parts of xylene.

Degreased panels of 20 gauge steel and having the dimensions 1 inch by 4 inches were dip coated with this composition by the use of a Fisher-Payne dip coater so as to provide cured coatings of 1 mil in thickness. The coated panels were air dried until tack free and then baked for thirty minutes at 400° F.

Baked panels showed no failure of the film after immersion in xylene for 755 hours. Baked panels showed no failure of the film after immersion in acetone for 755 hours. Baked panels showed an initial failure only after immersion in a 2 percent solution of detergent for 410 hours.

Example III

Degreased panels of 20 gauge steel and having the dimensions 1 inch by 4 inches were sprayed with the composition of Example I. The panels were then baked at 400° F. for one-half hour. The panels were cooled and then immersed in water at 212° F. and examined every one-half hour for ten hours. At the end of this time, the films showed no breakdown or deterioration.

Other panels were bent about a mandrel having a diameter of 1/16 inch and showed no cracking or deterioration of the film.

*Example IV*

A red iron oxide primer was formulated as follows:

| | |
|---|---|
| Multipolymer of Example I | 217 |
| Red iron oxide—Mapico 4485 | 136 |
| Mistron HG–75 (Sierra talc) | 104 |
| Xylene | 291.8 |
| Epoxidized novolak of Example I | 29.8 |

This primer was coated on test panels described above to provide a coating 1 mil thickness. After baking, the panel could be bent around a 1 inch mandrel without cracking of the film. However, when bent around a mandrel having a 1/4 inch diameter, there was a slight cracking of the film.

*Example V*

A white top-coat enamel composition was formulated as follows:

| | |
|---|---|
| Multipolymer of Example I | 217 |
| $TiO_2$—RA–50 (Titanox) | 140 |
| Zinc oxide No. 17 (St. Joseph Lead Co.) | 24.7 |
| Xylene (Cellosolve acetate 50/50 w.) | 216.3 |
| Epoxidized novolak of Example I | 29.8 |

This enamel formed smooth continuous white coatings for test specimens.

From the foregoing, it is clear that a desirable coating may be made by adding sufficient solvent to a multipolymer of styrene, 2-ethyl hexyl acrylate, methacrylic acid, and 4-vinyl pyridine, to provide a solution having a ratio of 55 parts of multipolymer solids to 45 parts of solvent and adding sufficient epoxidized cresol-formaldehyde novolak thereto to provide a weight ratio of 4 multipolymer solids to one of the epoxidized cresol-formaldehyde novolak.

Organic solvents may be added to this composition of epoxidized cresol-formaldehyde novolak resin and multipolymers in different amounts and proportions depending upon the application and coating conditions. Brushing, spraying, or dipping will require an adjustment in the quantity of these diluents to produce the most satisfactory spreading, flowing, and drying properties. Acetone, methyl ethyl ketone, isophorone, ethyl acetate, butyl Cellosolve, butyl Carbitol acetate, xylene and toluene may be used for example.

Various pigments, fillers, and extenders such as titanium dioxide, red lead, diatomaceous earth, alumina, silica, zinc oxide, etc. may also be added to the composition to obtain a desired color or consistency.

The baking of the coating is believed to result in the cross-linking by chemical bonds. While the baking time varies slightly as a function of temperature, excellent coatings are prepared by baking the coating for one-half hour at temperatures from 150° C. to 300° C. Advantageously, the coating is air-dried before the baking steps.

The composition of this invention shows exceptional merit as a protective coating for metals. The composition when applied as a coating has the desirable physical properties of adhesion, gloss, hardness, flexibility, and impact resistance as well as the desirable chemical properties such as resistance to caustic, acid, salts, detergents, boiling water, and organic solvents.

We claim:

1. The production of a composition suitable for the protective coating of metals which comprises the steps of copolymerizing by weight 70 parts of styrene, 19 parts of 2-ethyl hexyl acrylate, 3 parts of methacrylic acid and 4 parts of 4-vinyl pyridine in a polar solvent and in the presence of benzoyl peroxide to produce a solution having a ratio of 55 parts of solids to 45 parts solvent and adding the product to an epoxidized cresol-formaldehyde resin in a ratio of 88 parts of solution to 12 parts of epoxidized cresol-formaldehyde resin.

2. A composition of matter comprised of an admixture of a multipolymer solution of at least 50 parts styrene, at least 15 parts 2-ethyl hexyl acrylate, at least 5 parts methacrylic acid and at least 0.1 part 4-vinyl pyridine with an epoxidized cresol-formaldehyde resin said multipolymer being contained in said admixture in a weight ratio of 4 multipolymer solids to one of the epoxidized cresol-formaldehyde novolak.

3. A process for producing a baked coating which comprises mixing an epoxidized cresol-formaldehyde resin with a multipolymer solution produced by copolymerizing in organic polar solvent at least 50 parts styrene, at least 15 parts 2-ethyl hexyl acrylate, at least 5 parts methacrylic acid and at least 0.1 part vinyl pyridine in the presence of benzoyl epoxide said multipolymer being mixed with said epoxidized cresol-formaldehyde novolak in a weight ratio of 4 multipolymer solids to 1 epoxidized cresol-formaldehyde novolak.

4. A process for coating of articles which comprises coating the article with a composition formed by the admixture of one part epoxidized cresol-formaldehyde resin and 4 parts by weight of solids of multipolymer solution of at least 50 parts styrene, at least 15 parts 2-ethyl hexyl acrylate, at least 5 parts methacrylic acid and at least 0.1 part 4-vinyl pyridine and baking the coating so as to cross-link the composition to form an adherent, durable coating for the article.

References Cited in the file of this patent

UNITED STATES PATENTS

| | | |
|---|---|---|
| 2,817,616 | Wolfe | Dec. 24, 1957 |
| 2,818,398 | Cleverdon | Dec. 31, 1957 |
| 2,897,175 | Howe et al. | July 28, 1959 |
| 2,918,391 | Hornibrook | Dec. 22, 1959 |
| 2,941,990 | Schuller | June 21, 1960 |